(12) United States Patent
Scheuer et al.

(10) Patent No.: US 12,189,605 B1
(45) Date of Patent: Jan. 7, 2025

(54) CONTROLLING CONCURRENTLY EXECUTING THREADS

(71) Applicant: SAP SE, Walldorf (DE)

(72) Inventors: Tobias Scheuer, Bruchsal (DE); Mathias Gottschlag, Altrip (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/347,773

(22) Filed: Jul. 6, 2023

(51) Int. Cl.
*G06F 16/23* (2019.01)

(52) U.S. Cl.
CPC ...... *G06F 16/2315* (2019.01); *G06F 16/2365* (2019.01)

(58) Field of Classification Search
CPC .......................... G06F 16/2315; G06F 16/2365
See application file for complete search history.

(56) References Cited

U.S. PATENT DOCUMENTS

| | | | |
|---|---|---|---|
| 7,805,326 B2 | 9/2010 | Scheuer | |
| 7,810,071 B2 | 10/2010 | Thebes et al. | |
| 8,073,722 B2 | 12/2011 | Biegler et al. | |
| 9,483,512 B2 | 11/2016 | Schreter et al. | |
| 9,740,525 B2 | 8/2017 | Scheuer | |
| 9,983,903 B2 | 5/2018 | Ailamaki et al. | |
| 10,108,524 B2 | 10/2018 | Scheuer et al. | |
| 10,459,760 B2 | 10/2019 | Scheuer | |
| 10,884,796 B2 | 1/2021 | Scheuer et al. | |
| 11,042,527 B2 | 6/2021 | Scheuer et al. | |
| 11,429,388 B2 | 8/2022 | Thomsen et al. | |
| 11,481,298 B2 | 10/2022 | Scheuer | |
| 2006/0271420 A1 | 11/2006 | Anselmann et al. | |
| 2017/0017674 A1 | 1/2017 | Scheuer et al. | |
| 2018/0352028 A1* | 12/2018 | Qian | G06F 16/119 |
| 2019/0205203 A1* | 7/2019 | Hwang | G06F 11/0727 |

OTHER PUBLICATIONS

U.S. Appl. No. 18/338,623, Gottschlag et al., Jun. 21, 2023.

* cited by examiner

*Primary Examiner* — Cam Y T Truong
(74) *Attorney, Agent, or Firm* — Fish & Richardson P.C.

(57) ABSTRACT

The present disclosure relates to computer-implemented methods, software, and systems for controlling the execution of concurrent threads executing tasks in a database management system. A first task is executed at a first thread from a pool of threads for execution of tasks at the database management system. It can be identified that the execution of the first task is paused and that the first task is in a sleep mode. In response to identifying that the first task is in an awake mode after the sleep mode, it can be determined whether a current number of threads in the pool that are currently processing tasks in parallel is below an allowed number of threads. It can be determined that the allowed number of threads has been reached and a waiting status can be assigned to the first task at the first thread.

14 Claims, 5 Drawing Sheets

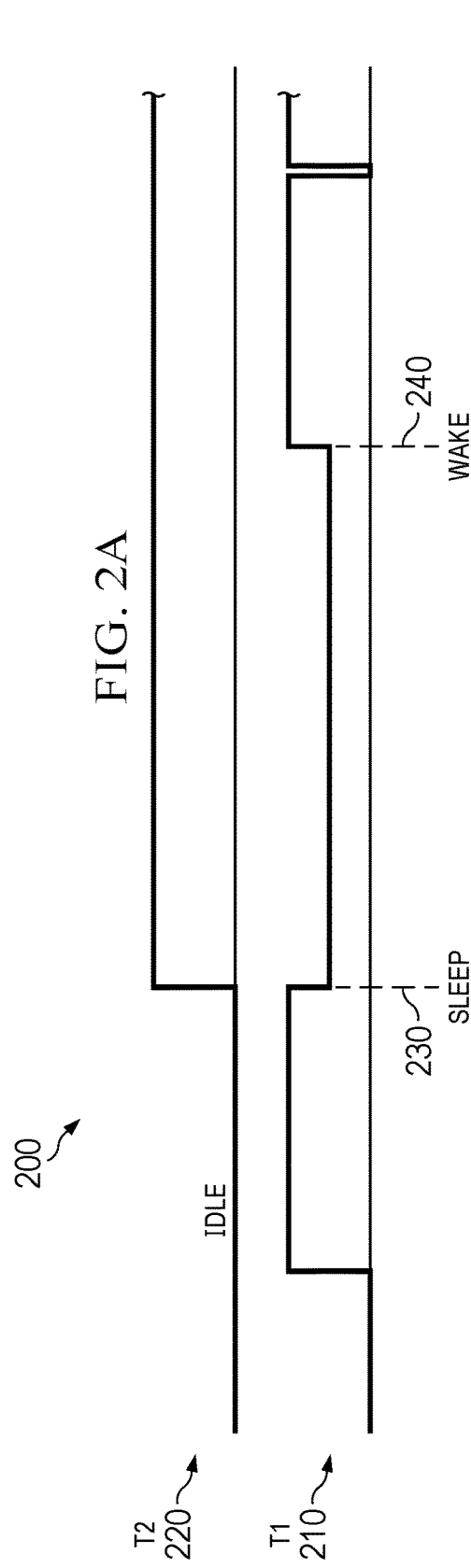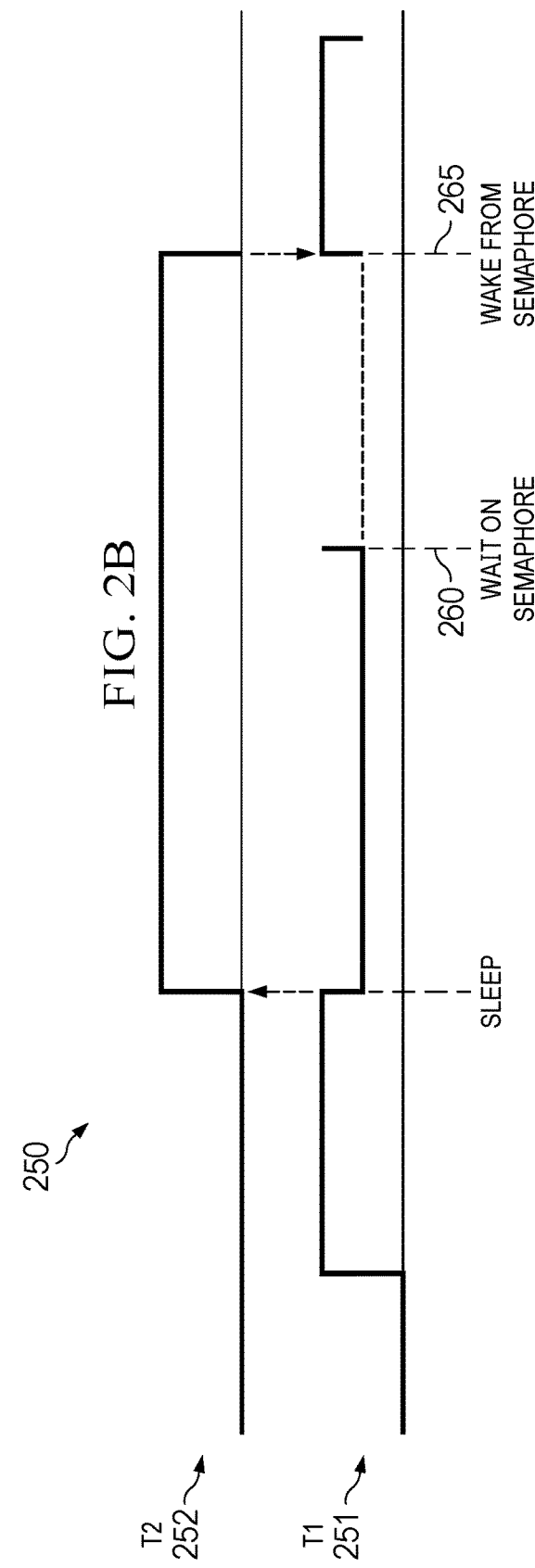

CONTROLLING CONCURRENTLY EXECUTING THREADS

TECHNICAL FIELD

The present disclosure relates to computer-implemented methods, software, and systems for data processing.

BACKGROUND

Software complexity is increasing and causing changes to lifecycle management and maintenance of software applications, databases, and platform systems. The volume of data generated by various applications and services has also grown rapidly. Processing and storing of data can be associated with a large amount of computer resources such as computing, storage, and network resources. Executing data queries over large data volumes can be a cumbersome task that can involve various considerations including prioritization, resource limitations, account configurations, or maintenance, among other examples.

SUMMARY

Implementations of the present disclosure are generally directed to a computer-implemented method for controlling the execution of concurrent threads executing tasks in a database management system.

One example method may include operations such as executing a first task at a first thread from a pool of threads for execution of tasks at the database management system; identifying that the execution of the first task is paused and that the first task is in a sleep mode; in response to identifying that the first task is in an awake mode after the sleep mode, determining whether a current number of threads in the pool that are currently processing tasks in parallel is below an allowed number of threads; and in response to determining that the allowed number of threads has been reached, assigning a waiting status to the first task at the first thread.

Particular embodiments of the subject matter described in this specification can be implemented to realize one or more of the following advantages. The performance of a database system can be optimized by controlling the number of concurrent threads that work on tasks in parallel. By limiting the number of concurrent threads on the general and/or local (user) level while also allowing new threads to be opened when a task goes into a sleep mode, the load for executing tasks can be more evenly distributed and the computational resources can be used more efficiently. The concurrent threads that are allowed to execute are limited in number, and additional waiting time can be applied for tasks that awake when the limit is violated. Thus, tasks that can continue their execution would be allowed to do so only when their continued execution would not exceed a maximum allowed number of threads that are able to run in parallel in the system. Such an addition of waiting time can support the load balancing of the system and also can reduce the risk of downtime due to overloading of the system. Further, the limiting of the number of concurrent threads can be applied in the context of multiple users or accounts that share the resources of one system when executing respective tasks. Maximum allowed numbers of threads associated with respective users (or accounts) as well as a maximum allowed number of threads associated with the system as a whole can be defined to support smooth task executions and load balancing during execution of requests associated with different parties that share the resources of the same database system.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors and a computer-readable storage medium coupled to the one or more processors, having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the descriptions below. Other features and advantages of the present disclosure will be apparent from the descriptions, drawings, and the claims.

BRIEF DESCRIPTION OF DRAWINGS

FIG. 2A is a block diagram of an example pool with two threads where tasks are scheduled and executed without applying limiters.

FIG. 2B is a block diagram of an example pool with two threads where tasks are scheduled and executed when limitations to the number of allowed threads which are able to run in parallel are applied in accordance with implementations of the present disclosure.

DETAILED DESCRIPTION

Figure 1:
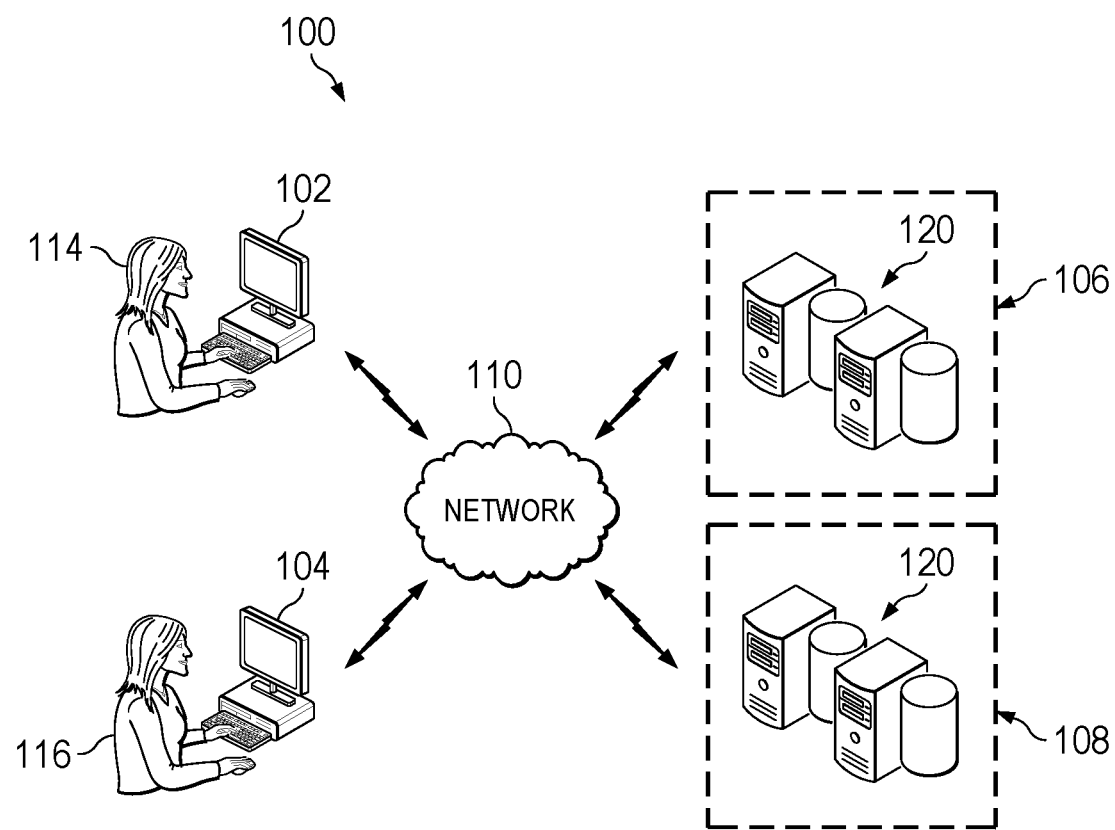
FIG. 1 is a block diagram depicting an example computer-implemented system that can execute implementations of the present disclosure.

The present disclosure describes various tools and techniques for controlling the execution of concurrent threads executing tasks in a database management system.

In some instances, a database management system can be configured to run and execute queries based on provided available computing resources. In some cases, to maximize the overall performance of the system, the demand for resources can be balanced between various worker threads supporting multi-thread processing to optimize the execution of different types of operations or tasks by using the available resources in an efficient manner. By optimizing the performance and execution of tasks (e.g., queries, data processing operations, etc.), the robustness of the response time for executed requests can be optimized since response time for executed tasks can be more predictable as substantial delays or downtime can be avoided.

In some implementations, the load on a database management system from execution of tasks at a pool of threads can be managed by selectively applying limitations, and optionally priorities, to process requests and execute tasks. The management of the resources can be performed to use the computing resources of the database management system (e.g., the CPU, the number of active threads in the pool, and the memory) more efficiently. In some instances, the control of the execution of the threads can be performed by executing checks to determine how many active threads there are at a given moment, such as when a particular task (or job) has woken up from a sleep mode, to determine whether to continue the execution of the task at the thread or to delay the execution by adding waiting time for the task. Such addition of waiting time can be done when the number of running threads at the time the task wakes up have already reached a limit of the allowed number of threads for parallel execution at the system.

In some instances, queries can be requested for execution at a database system, such as transactional or analytic queries. Some queries can be executed as a single task and can be run on a single thread while other queries can tend to include more complex operations and tasks and may benefit from utilizing multiple threads during execution. When managing the load of execution of tasks at a database management system, the overall system performance may be optimized by balancing the demand for resources between multiple threads (or worker threads).

In some instances, the execution of multiple thread processing can be established at a database system and a pool of threads can be provided to handle requests for executing tasks. A thread from the pool can be selected for the execution of each task. When tasks are executed, they may need resources such as network availability, or access to database storage, among other resources or other external events on which the tasks can depend. In those cases, a task may go into a sleep mode while waiting to obtain the resources needed or to receive a notification for the external event. When a task is in a sleep mode, the thread is running and thus, another thread may be used for executing another task. It can be appreciated that in a large database system, the number of threads can be high, and the task execution can be associated with multiple tasks that await execution, for example, stored in a queue.

In some instances, a limitation on the maximum allowed number of threads that can be executed in parallel within a pool of threads can be defined, thus, to limit the load of the database system and to avoid the risk of overloading, but also to support load balancing and efficient usage of the computing resources. The limitation can be defined as an allowed number of threads that should not be exceeded while processing tasks over multiple threads in a pool. For example, if there are two threads and the limit is set to one, when one task is started at one thread, another task cannot be started before the first task has finished or has been determined to be in a sleep mode. In those cases where the first task has gone into a sleep mode, when the task awakes (e.g., has received access to resources such as access to a network), it can be determined whether the second thread is still executing the second task. If that is so, the first task can be assigned with waiting time since it cannot continue running when the limit of one thread at a time has been reached. The first task can be woken up, when it is determined that the second task has finished its execution (or when the task has gone in a sleep mode). In some instances, the control of the processing of tasks in parallel in a pool of multiple treads with implemented limits to the allowed number of parallel threads can be performed as described further in FIGS. 1, 2B, 3, and 4.

FIG. 1 is a block diagram depicting an example computer-implemented system 100 that can execute implementations of the present disclosure. In the depicted example, the example system 100 includes a client device 102, a client device 104, a network 110, a computing environment 106, and a computing environment 108. The computing environment(s) 106 and/or 108 can be cloud computing environments that can include one or more server devices and databases (for example, processors, memory). In the depicted example, a user 114 interacts with the client device 102, and a user 116 interacts with the client device 104.

In some examples, the client device 102 and/or the client device 104 can communicate with the environment 106 and/or environment 108 over the network 110. The client device 102 can include any appropriate type of computing device, for example, a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 110 can include a large computer network, such as a local area network (LAN), a wide area network (WAN), the Internet, a cellular network, a telephone network (for example, PSTN), or an appropriate combination thereof connecting any number of communication devices, mobile computing devices, fixed computing devices and server systems.

In some implementations, the environment 106 (and/or the environment 108) can include at least one server and at least one data store 120. In the example of FIG. 1, the environment 106 is intended to represent various forms of servers including, but not limited to, a web server, an application server, a proxy server, a network server, and/or a server pool. In general, server systems accept requests for application services and provide such services to any number of client devices (for example, the client device 102 over the network 110).

In accordance with implementations of the present disclosure, and as noted above, the environments 106 and/or the environment 108 can host applications and databases running on the host infrastructure. In some instances, the environment 106 can include multiple cluster nodes that can represent physical or virtual machines that can represent web node clusters. A hosted application and/or service can run on virtual machines (VMs) hosted on cloud infrastructure.

In some instances, the environment 106 and/or the environment 108 can provide infrastructure for hosting an analytical tool in accordance with the present disclosure.

In some instances, the environments 106 or 108 can host applications and/or databases that can support execution of tasks in a concurrent manner by controlling the execution over parallel threads in accordance with the present disclosure. In some instances, the environments 106 or 108 can host a database management system where queries are executed on parallel threads. The queries (or other tasks) can be executed by defining and queuing tasks or jobs that can be scheduled and pushed for processing over the threads. In some instances, the system may provide multiple N threads, where limits to the number of threads can be imposed. For example, no more than M threads can run simultaneously to process a task or a job (where M is smaller or equal than N). The limits to the number of threads allowed to run in parallel can be configured on system general level or can be further defined per user or account. The execution of tasks at the threads can be controlled and managed in accordance with the implementations of the present disclosure.

FIG. 2A is a block diagram of an example pool 200 with two threads, T1 and T2, where tasks are scheduled and executed without applying limiters.

A first thread 210, T1, can be started to execute a first task that can go into a sleep mode 230. For example, the first task can go into a sleep mode while waiting for access to a network, when waiting for a storing operation to be executed, when waiting for another dependent task to be executed to proceed with its processing. A second thread 220, T2, can be started to execute another task, where the execution can start, for example, when the first task has gone into the sleep mode 230. At that point in time, only one task is executed at a time, even though there are two threads available for the execution of tasks. When the first task is awake at 240 (e.g., the access to the network is provided or another event has been identified that awakes the first task), the first task can continue its execution on the first thread 210, T1. In that moment, if the second task is running on the second thread 220, T2, there will be two threads concurrently working on two tasks. In some cases, it may be desired to limit the processing of tasks at these two threads in the pool 200 to 1. Such limitation can be performed by monitoring the state of the threads and the number of active threads and comparing it with a defined number of threads allowed to run concurrently. The number of threads allowed to run concurrently can be set up as a parameter that takes a value that is below the number of all threads in the pool.

FIG. 2B is a block diagram of an example pool 250 with two threads where tasks are scheduled and executed when limitations to the number of threads allowed to run in parallel are applied in accordance with implementations of the present disclosure. If limitations are to be applied to the execution of tasks over multiple threads, a task that awakes for continued execution may not be allowed to continue if that execution would violate the defined number of number of threads allowed to run in parallel.

In the context of the example pool 200 of FIG. 2A, if a limitation is to be applied, when the first task awakes at 240, that first task should not be allowed to continue its execution in the situation where the maximum number of threads allowed to run in parallel is one. However, if the limitation is set to two threads, that would be possible.

In accordance with implementations of the present disclosure, two threads T1 251 and T2 252 can run in a pool 250 in similar manner to the pool 200 of FIG. 2A. In some instances, a first task substantially similar to the first task of FIG. 2A is run on the first thread T1, and can go to sleep corresponding to the sleep mode 230 in FIG. 2A. When the first task is woken up at 260 which can correspond to the waking up at 240 of FIG. 2A, a determination can be made as to the number of threads that are allowed to perform parallel processing as well as the number of currently running threads. In the example of FIG. 2A, when the first task is awake at 240, the current number of running threads is one (1), and the limit for the allowed number of threads is set to one (1) as well. Thus, if limitations are to be applied, as shown in FIG. 2B, the first task can be put into a waiting mode 260, where the waiting mode 260 can continue up until the second thread 252, T3, has finished the execution of the second task. When the second task finishes its execution at the second thread 252, T2, the first task can be woken up and thus the waiting time would be stopped and then the first task can resume its processing at 265.

Figure 3:
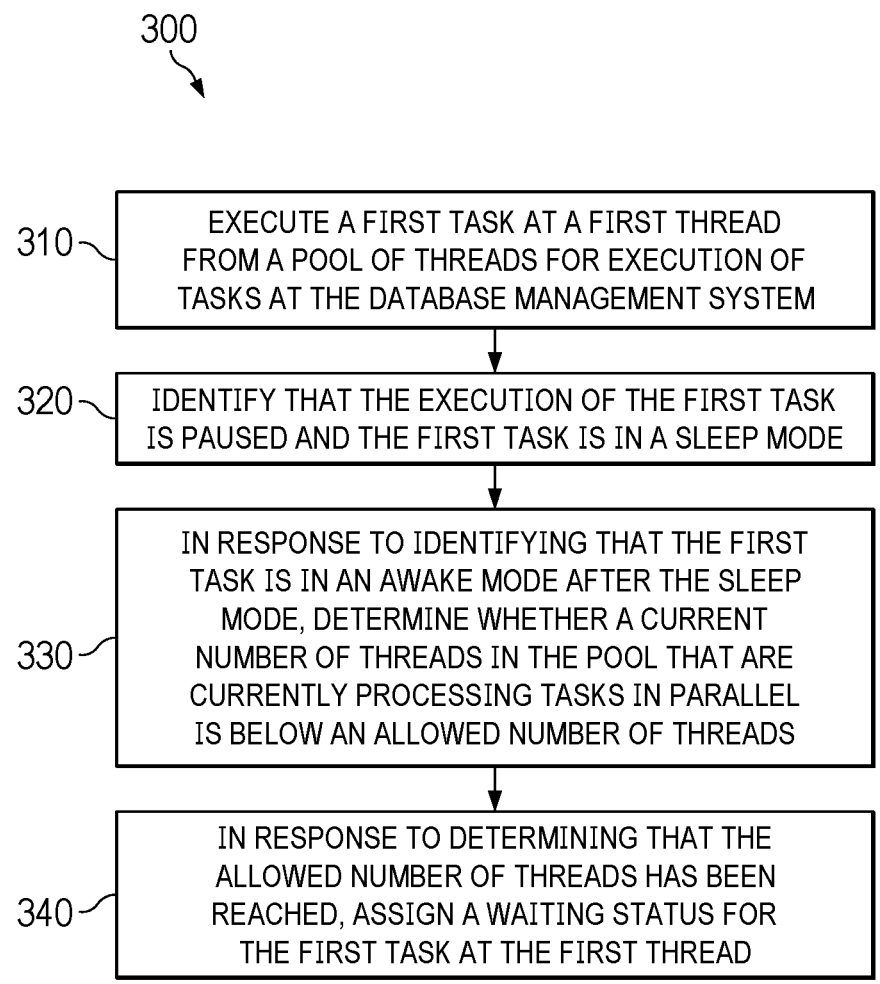
FIG. 3 is a flow diagram of a method for controlling the execution of concurrent threads executing tasks in a database management system in accordance with implementations of the present disclosure.

FIG. 3 is a flow diagram of a method 300 for controlling the execution of concurrent threads executing tasks in a database management system in accordance with implementations of the present disclosure. The method 300 can be executed at a database management system in connection with applying limitations to the execution of tasks over multiple thread pools to optimize resource consumption and load balance processing to avoid downtime. The method 300 can be applied to managing the execution of tasks at a pool such as the pool 250 of FIG. 2B. Further, the method 300 can be executed in the context of a system environment where the control of task execution is managed by a thread monitor that can collaborate with a task execution queue to control the parallel execution of tasks in a database management system in accordance with implementations of the present disclosure.

At 310, a first task is executed at a first thread from a pool of threads for the execution of tasks at the database management system. In some instances, the threads in the pool can pull a task from a queue of tasks when there are available threads to execute new tasks and when the number of threads allowed to execute tasks in parallel is not exceeded. In some instances, the execution of tasks can be prioritized by organizing the tasks in a queue that stores the tasks in a prioritized order.

At 320, the execution of the first task can be identified to be paused and the first task can be put into a sleep mode. For example, the sleep mode of the first task can be associated with the logic implemented for the task execution. In some cases, the task execution may require external resources, to perform an operation at another entity (e.g., write data in a file, await to obtain a lock on a resource, etc.), or other external event on which the task may depend.

At 330, in response to identifying that the first task is in an awake mode after the sleep mode, a current number of threads that are currently processing tasks in parallel can be determined. It can be determined whether the current number of threads that are in parallel processing mode at that moment is below an allowed number of threads. In some instances, the allowed number of threads can be defined as a limiter for the pool in general or can be defined for the user or account level. In some cases, the allowed number of threads can be defined as a combination of global and local limitations.

In some instances, the allowed number of threads is a currently allowed number of threads for parallel processing in the pool for a first user of the database management system that is associated with the first task. In some cases, a first allowed number of threads for processing tasks in parallel in the pool can be configured on the user level. For example, a user may be assigned with a limit of a maximum of two allowed threads for parallel processing of tasks. Further, a global allowed number of threads for processing tasks in parallel in the pool can be configured as applicable for the pool as a global limit. In some instances, in cases where there are global and local limits, aggregation of the limits can be performed when a particular request for execution is received and the relevant allowed limit can be calculated at runtime to consider all tasks requested for execution and the limits associated with local levels (e.g., based on a user) and/or on global levels (e.g., for the whole or a portion of the threads in the pool).

For example, a pool with four threads can be assigned with a global limit of three allowed threads for parallel processing of tasks. In those examples, a currently allowed number of threads for parallel processing in the pool for the first user associated with the first task can be either the number of allowed threads that are defined for the first user, which can be two threads as in the above example, or a number of threads that corresponds to the global allowed number but excludes the number of other threads that are currently running at the pool and for example are associated with other users. In the current example, that number of two threads would be applicable in the case where the total number of threads working in parallel does not exceed three (the global limit). For example, if there is another user who is provided with an allowed number of threads to run in parallel that is also two, and that user is associated with two other tasks running currently in parallel over two other threads, then the first user would not be allowed to run any more tasks even if he has only requested one task for execution. The reason is that the current number of threads that are running would reach three threads (the sum of one thread for the first user, and two more threads for the other user). The first task can be resumed, or a subsequent task can be run at the first or other thread, when the allowed number of threads is not reached.

At 340, in response to determining that the allowed number of threads has been reached, a waiting status for the first task can be assigned. In some instances, the assignment of the waiting status can be substantially similar to the discussed waiting 260 for the first task at FIG. 2B.

Figure 4:
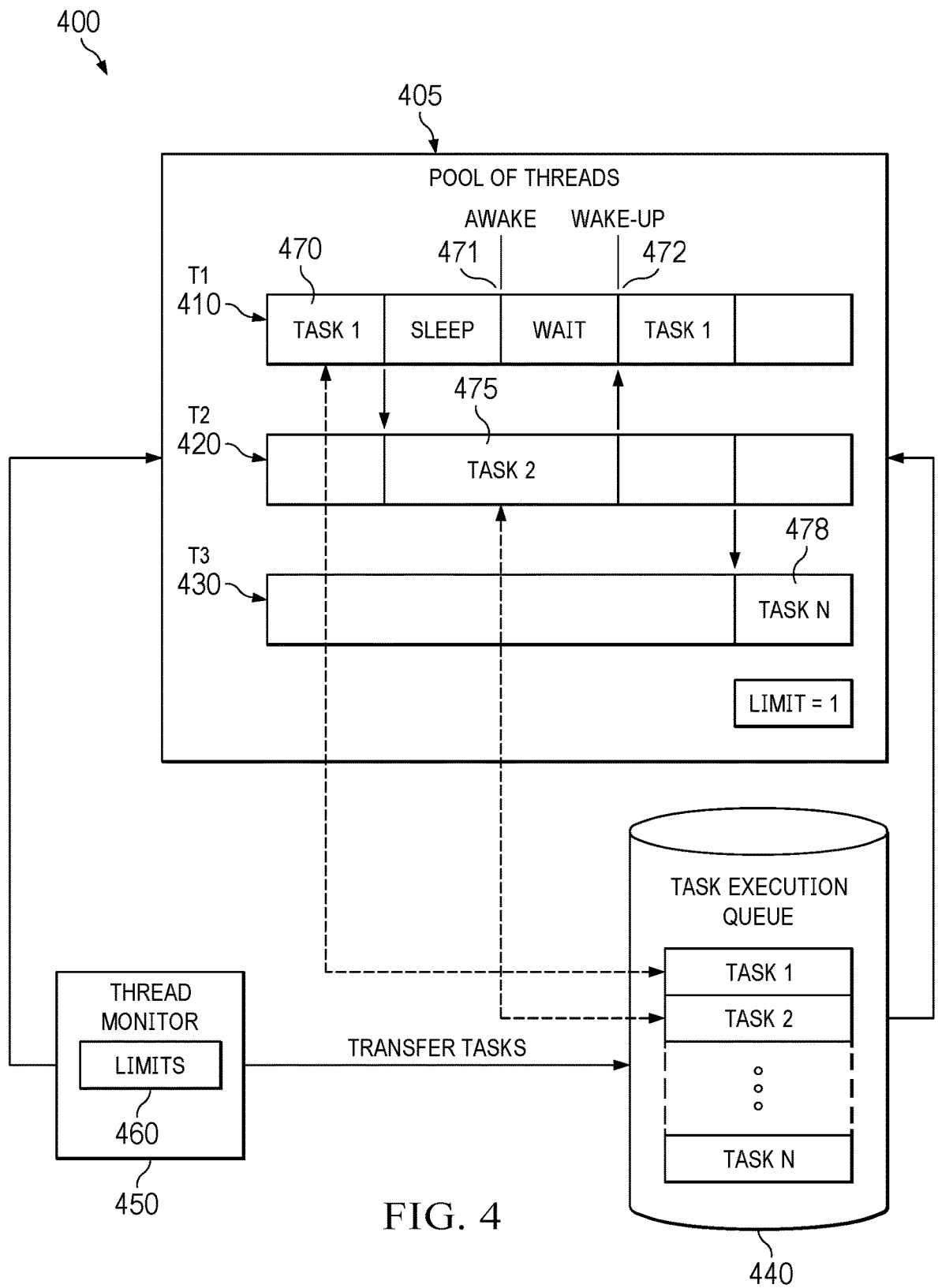
FIG. 4 is a block diagram of a database system environment where the execution of concurrent threads is controlled to allow a threshold number of threads for execution in parallel at any given time in accordance with implementations of the present disclosure.

FIG. 4 is a block diagram of a database system environment 400 where the execution of concurrent threads is controlled to allow a threshold number of threads for execution in parallel at any given time in accordance with implementations of the present disclosure.

In some instances, the database system environment 400 includes a pool of threads for parallel execution of tasks that can be substantially similar to the pool 200 of FIG. 2A, and the pool 250 of FIG. 2B. In some instances, the pool of threads 405 is set up for the execution of tasks in parallel over multiple threads, where the tasks are stored in a task execution queue 440. The queue stores multiple tasks in order, for example, based on the task priority. The task that is at the top of the queue can be the task that has the highest priority and is the task that would be the next in line for execution at a thread in the pool 405.

In some instances, the pool of threads 405 can include three threads, T1 410, T2 420, and T3 430. The pool 405 can be configured with a limit such as one thread processing at a time. Thus even if there are multiple threads, multiple threads processing in parallel would not be allowed. A task, such as "task 1" 460, from the task execution queue 440 can be provided to the first thread T1 410 for execution, where the "task 1" 470 can go into a sleep mode at a point in time that can be associated with a request for resources for the execution of "task 1" 470 that are awaited. Since the limit is set to one, there is no other task that can be pulled from the queue 440 to be executed at another thread while the "task 1" 470 is in active mode. When the "task 1" 470 goes into the sleep mode, a notification can be sent to the queue 440 that another task can be provided, for example, to the second thread T2 420. For example, the performance of the threads can be monitored by a thread monitor 450. The thread monitor 450 can keep a list of limits 460 for executing tasks and a status (or number) of available additional threads that can be used to run further tasks. For example, when a first task is provided for execution, the further allowed number of threads for executing tasks in parallel can be determined to be zero, since the limit is one and the current number of running threads is one.

When the first task goes to sleep, the "task 2" 475 can be provided by the queue 440 for execution. While "task 2" 475 is executing, the "task 1" 470 can become awake at 471 from the sleep mode. When the awake state 471 is identified by the thread monitor 450, the thread monitor 450 can check the limits 460 and determine that at the current moment there is one other thread that is running and can assign a waiting state to the "task 1" in T1. When the second task 475 finishes its execution, the thread monitor 450 can send a request to wake up 472 the first task and to allow the first task to finish its execution at the T1 thread. When tasks are provided for execution from the queue 440, they are removed from the queue, and there can be objects registered at the limits 460 of the thread monitor 450 to keep information for the execution state of the task and to control the state of the task by assigning a wait state so as not to overload the processor and to maintain balanced and efficient utilization of the resources. Subsequent tasks from the queue 440, such as task 487, can be invoked for execution at the thread T3 430, when there are no other tasks running on another thread, thus to comply with the allowed number of threads that run in parallel, which in this example is one. It can be understood that other limits can be configured and applied to the processing of tasks in parallel in a pool of threads as discussed in the present disclosure.

In some cases, tasks can be long-running, and synchronization during their execution can help maintain the processing of tasks as multiple threads balanced without overloading the system temporarily which can lead to downtime and poor performance of task execution.

Figure 5:
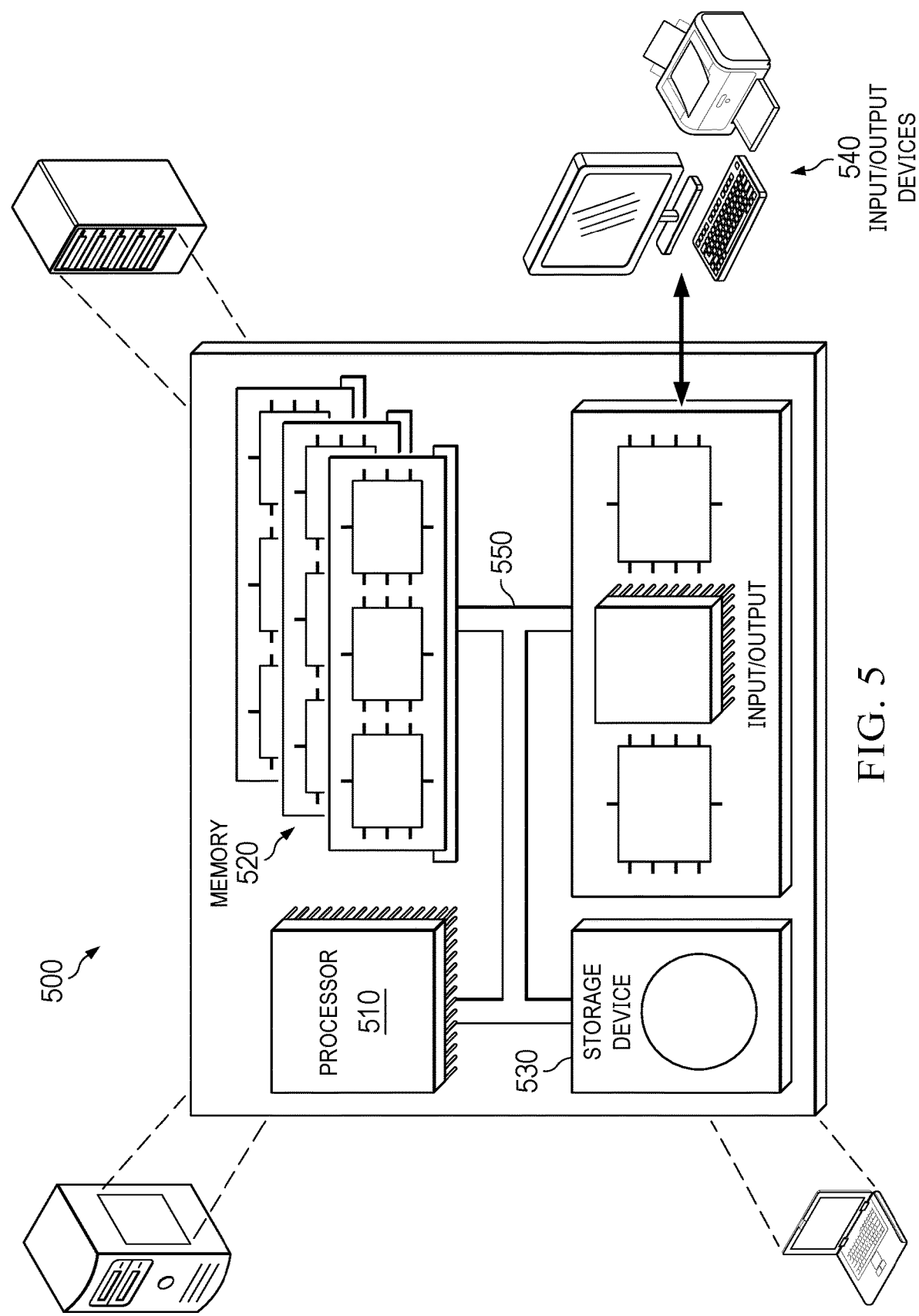
FIG. 5 is a schematic diagram of an example computer system that can be used to execute implementations of the present disclosure.

FIG. 5 is a schematic diagram of an example computer system 500 that can be used to execute implementations of the present disclosure. For example, the computer system 500 may be included in any or all of the server components discussed herein. The computer system 500 includes a processor 510, a memory 520, a storage device 530, and an input/output device 540. The components 510, 520, 530, and 540 are interconnected using a system bus 550. The processor 510 is capable of processing instructions for execution within the computer system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the computer system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the computer system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or combinations of these. The apparatus can be implemented in a computer program product tangibly embodied in an information carrier (for example, in a machine-readable storage device, for execution by a programmable processor), and method operations can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or another unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory, or both. Elements of a computer can include a processor for executing instructions and one or more memories for storing instructions and data. Generally, a computer can also include, or be operatively coupled to communicate with, one or more mass storage devices for storing data files. Such devices include magnetic disks, such as internal hard disks and removable disks, magneto-optical disks, and optical disks. Storage devices suitable for tangibly embodying computer program instructions and data include all forms of non-volatile memory, including by way of example semiconductor memory devices, such as sPROM, EEPROM, and flash memory devices, magnetic disks such as internal hard disks and removable disks, magneto-optical disks, and CD-ROM and DVD-ROM disks. The processor and the memory can be supplemented by, or incorporated in, ASICs (application-specific integrated circuits).

To provide for interaction with a user, the features can be implemented on a computer having a display device such as a cathode ray tube (CRT) or liquid crystal display (LCD) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of these. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the one described. The relationship between client and server arises by virtue of computer programs running on the respective computers and having a client-server relationship with each other.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

In view of the above-described implementations of subject matter, this application discloses the following list of examples, wherein one feature of an example in isolation or more than one feature of said example taken in combination and, optionally, in combination with one or more features of one or more further examples are further examples also falling within the disclosure of this application.

EXAMPLES

Although the present application is defined in the attached claims, it should be understood that the present invention can also be (alternatively) defined in accordance with the following examples:

Example 1. A computer-implemented method for controlling parallel processing of tasks at a database management system, the method comprising:
  executing a first task at a first thread from a pool of threads for execution of tasks at the database management system;
  identifying that the execution of the first task is paused and that the first task is in a sleep mode;
  in response to identifying that the first task is in an awake mode after the sleep mode, determining whether a current number of threads in the pool that are currently processing tasks in parallel is below an allowed number of threads; and
  in response to determining that the allowed number of threads has been reached, assigning a waiting status to the first task at the first thread.

Example 2. The method of Example 1, further comprising:
  in response to determining that at least one other thread from the pool of threads has finished executing a task, waking up the execution of the first task at the first thread to continue processing.

Example 3. The method of any one of the preceding Examples, further comprising:
  establishing a queue of tasks to be executed at the pool of threads, where tasks from the queue are consecutively provided for parallel or sequential execution at one or more threads of the pool.

Example 4. The method of Example 3, wherein the queue is maintained to store first objects associated with tasks awaiting execution at a thread in the pool of threads, and wherein the queue stores second objects associated with tasks that are already started at a thread in the pool and are in a sleep mode, wherein the second objects are stored with a higher priority in the queue, wherein the method further comprises:

when a task is executed at a thread in the pool, invoking an object from the queue for execution at a thread in the pool.

Example 5. The method of any one of the preceding Examples, further comprising:

in response to determining that the first task has finished executing at the first thread, invoking a subsequent task from a queue of tasks to be executed.

Example 6. The method of any one of the preceding Examples, wherein the first task is a task associated with a set of sub-tasks that are required for the execution of the first task to finish, wherein the first task goes into the sleep mode when a first sub-task from the set of sub-tasks is invoked for execution at a different thread from the pool of threads.

Example 7. The method of Example 6, wherein the first task includes a set of sub-tasks for scanning a set of tables, wherein each sub-task of the set of sub-tasks is correspondingly associated with a table from the set of tables.

Example 8. The method of any one of the preceding Examples, wherein the allowed number of threads is a currently allowed number of threads for parallel processing in the pool for a first user of the database management system that is associated with the first task, and wherein determining whether the current number of threads that are currently processing tasks is below the allowed number of threads comprises:

determining a first allowed number of threads for processing tasks in parallel in the pool by the first user associated with the first task as a user limit;

determining a second allowed number of threads for processing tasks in parallel in the pool applicable for the pool as a global limit; and determining the currently allowed number of threads for parallel processing in the pool to correspond to a higher number between i) the first allowed number of threads and ii) a number of the second allowed number of threads that are not currently processing a task associated with a user of the database management system.

Example 9. A system comprising:

one or more processors; and one or more computer-readable memories coupled to the one or more processors and having instructions stored thereon that are executable by the one or more processors to perform the method of any of Examples 1 to 8.

Example 10: A non-transitory, computer-readable medium coupled to one or more processors and having instructions stored thereon which, when executed by the one or more processors, cause the one or more processors to perform the method of any of Examples 1 to 8.

What is claimed is:

1. A computer-implemented method for controlling parallel processing of tasks at a database management system, the method comprising:

executing, by at least one processor, a first task at a first thread from a pool of threads for execution of tasks at the database management system;

identifying that the execution of the first task is paused and that the first task is in a sleep mode;

in response to identifying that the first task is in an awake mode after the sleep mode, determining, by the at least one processor, whether a current number of threads in the pool that is currently processing the tasks in parallel is below an allowed number of threads;

in response to determining that the current number of threads in the pool that is currently processing the tasks in parallel is at or above the allowed number of threads, assigning a waiting status to the first task at the first thread;

establishing, by the at least one processor, a queue of the tasks to be executed at the pool of threads, where the tasks from the queue are consecutively provided for parallel or sequential execution at one or more threads of the pool, wherein the queue is maintained to store first objects associated with tasks awaitinq execution at a thread in the pool of threads, and wherein the queue stores second objects associated with tasks that are already started at a thread in the pool and are in a sleep mode, wherein the second objects are different from the first objects, and the second objects are stored with a higher priority in the queue than the first objects; and when a task of the tasks from the queue is executed at a thread in the pool, invoking, by the at least one processor, an object of the first objects or second objects from the queue for execution at a thread in the pool.

2. The method of claim 1, further comprising:

in response to determining that at least one other thread from the pool of threads has finished executing a task, waking up the execution of the first task at the first thread to continue processing.

3. The method of claim 1, further comprising:

in response to determining that the first task has finished executing at the first thread, invoking a subsequent task from a queue of tasks to be executed.

4. The method of claim 1, wherein the first task is a task associated with a set of sub-tasks that are required for the execution of the first task to finish, wherein the first task goes into the sleep mode when a first sub-task from the set of sub-tasks is invoked for execution at a different thread from the pool of threads.

5. The method of claim 4, wherein the first task includes a set of sub-tasks for scanning a set of tables, wherein each sub-task of the set of sub-tasks is correspondingly associated with a table from the set of tables.

6. The method of claim 1, wherein the allowed number of threads is a currently allowed number of threads for parallel processing in the pool for a first user of the database management system that is associated with the first task, and wherein determining whether the current number of threads that is currently processing tasks is below the allowed number of threads comprises:

determining a first allowed number of threads for processing tasks in parallel in the pool by the first user associated with the first task as a user limit;

determining a second allowed number of threads for processing tasks in parallel in the pool applicable for the pool as a global limit; and determining the currently allowed number of threads for parallel processing in the pool to correspond to a higher number between i) the first allowed number of threads and ii) a number of the second allowed number of threads that are not currently processing a task associated with a user of the database management system.

7. A system comprising:

one or more processors; and one or more computer-readable memories coupled to the one or more processors and having instructions that are executable by the one or more processors to perform operations comprising:
  executing a first task at a first thread from a pool of threads for execution of tasks at a database management system;
  identifying that the execution of the first task is paused and that the first task is in a sleep mode;
  in response to identifying that the first task is in an awake mode after the sleep mode, determining whether a current number of threads in the pool that is currently processing the tasks in parallel is below an allowed number of threads;
  in response to determining that the current number of threads in the pool that is currently processing the tasks in parallel is at or above the allowed number of threads, assigning a waiting status to the first task at the first thread;
  establishing a queue of the tasks to be executed at the pool of threads, where the tasks from the queue are consecutively provided for parallel or sequential execution at one or more threads of the pool, wherein the queue is maintained to store first objects associated with tasks awaitinq execution at a thread in the pool of threads, and wherein the queue stores second objects associated with tasks that are already started at a thread in the pool and are in a sleep mode, wherein the second objects are different from the first objects, and the second objects are stored with a higher priority in the queue than the first objects; and
  when a task of the tasks from the queue is executed at a thread in the pool, invoking, by the at least one processor, an object of the first objects or second objects from the queue for execution at a thread in the pool.

8. The system of claim 7, wherein the one or more computer-readable memories store instructions, which when executed cause the one or more processors to perform operations comprising:
  in response to determining that at least one other thread from the pool of threads has finished executing a task, waking up the execution of the first task at the first thread to continue processing.

9. The system of claim 7, wherein the one or more computer-readable memories store instructions, which when executed cause the one or more processors to perform operations comprising:
  in response to determining that the first task has finished executing at the first thread, invoking a subsequent task from a queue of tasks to be executed.

10. A non-transitory computer-readable medium coupled to one or more processors and having instructions which, when executed by the one or more processors, cause the one or more processors to perform operations comprising:
  executing a first task at a first thread from a pool of threads for execution of tasks at a database management system;
  identifying that the execution of the first task is paused and that the first task is in a sleep mode;
  in response to identifying that the first task is in an awake mode after the sleep mode, determining whether a current number of threads in the pool that is currently processing the tasks in parallel is below an allowed number of threads;
  in response to determining that the current number of threads in the pool that is currently processing the tasks in parallel is at or above the allowed number of threads, assigning a waiting status to the first task at the first thread;
  establishing a queue of the tasks to be executed at the pool of threads, where the tasks from the queue are consecutively provided for parallel or sequential execution at one or more threads of the pool, wherein the queue is maintained to store first objects associated with tasks awaitinq execution at a thread in the pool of threads, and wherein the queue stores second objects associated with tasks that are already started at a thread in the pool and are in a sleep mode, wherein the second objects are different from the first objects, and the second objects are stored with a higher priority in the queue than the first objects; and
  when a task of the tasks from the queue is executed at a thread in the pool, invoking, by the at least one processor, an object of the first objects or second objects from the queue for execution at a thread in the pool.

11. The computer-readable medium of claim 10, wherein the computer-readable medium stores instructions, which when executed cause the one or more processors to perform operations comprising:
  in response to determining that at least one other thread from the pool of threads has finished executing a task, waking up the execution of the first task at the first thread to continue processing.

12. The computer-readable medium of claim 10, wherein the computer-readable medium stores instructions, which when executed cause the one or more processors to perform operations comprising:
  in response to determining that the first task has finished executing at the first thread, invoking a subsequent task from a queue of tasks to be executed.

13. The computer-readable medium of claim 10, wherein the first task is a task associated with a set of sub-tasks that are required for the execution of the first task to finish, wherein the first task goes into the sleep mode when a first sub-task from the set of sub-tasks is invoked for execution at a different thread from the pool of threads.

14. The computer-readable medium of claim 10, wherein the first task includes a set of sub-tasks for scanning a set of tables, wherein each sub-task of the set of sub-tasks is correspondingly associated with a table from the set of tables.

* * * * *